(12) United States Patent
Kirchner et al.

(10) Patent No.: US 9,052,715 B2
(45) Date of Patent: Jun. 9, 2015

(54) FLOW RATE CONTROLLER FOR HIGH FLOW RATES AND HIGH PRESSURE DROPS

(75) Inventors: Mark W. Kirchner, Seattle, WA (US); Gilbert Jones, Bothell, WA (US)

(73) Assignee: SKO FLO Industries, Inc., Woodinville, WA (US)

( * ) Notice: Subject to any disclaimer, the term of this patent is extended or adjusted under 35 U.S.C. 154(b) by 870 days.

(21) Appl. No.: 13/253,836

(22) Filed: Oct. 5, 2011

(65) Prior Publication Data

US 2012/0085439 A1    Apr. 12, 2012

Related U.S. Application Data

(60) Provisional application No. 61/390,035, filed on Oct. 5, 2010.

(51) Int. Cl.
*G05D 7/01*    (2006.01)

(52) U.S. Cl.
CPC .................................. *G05D 7/0126* (2013.01)

(58) Field of Classification Search
CPC ... G05D 7/0126; G05D 7/0133; G05D 7/014; F15B 2211/40515
USPC .............................. 137/500, 501, 503, 505.18
See application file for complete search history.

(56) References Cited

U.S. PATENT DOCUMENTS

| | | | | |
|---|---|---|---|---|
| 2,495,785 A * | 1/1950 | Stephens | .................... | 137/102 |
| 2,803,264 A * | 8/1957 | Griswold | .................... | 137/501 |
| 2,881,793 A * | 4/1959 | Lee | .................... | 137/501 |
| 3,554,222 A * | 1/1971 | Kihara et al. | .................... | 137/501 |
| 3,770,007 A * | 11/1973 | Orth et al. | .................... | 137/501 |
| 4,250,915 A * | 2/1981 | Rikuta | .................... | 137/501 |
| 4,422,470 A * | 12/1983 | Jackson et al. | .................... | 137/484.2 |
| 4,893,649 A | 1/1990 | Skoglund | | |
| 5,234,025 A * | 8/1993 | Skoglund et al. | .................... | 137/501 |
| 5,931,186 A * | 8/1999 | Skoglund | .................... | 137/486 |
| 6,688,319 B2 * | 2/2004 | Trantham et al. | .................... | 137/2 |
| 6,729,346 B2 * | 5/2004 | Fuhrmann | .................... | 137/501 |
| 6,827,100 B1 * | 12/2004 | Carlson | .................... | 137/454.6 |
| 6,932,107 B2 * | 8/2005 | Kirchner et al. | .................... | 137/501 |
| 7,380,293 B2 * | 6/2008 | Gilbertson et al. | .................... | 4/415 |
| 7,395,708 B2 * | 7/2008 | Kirchner et al. | .................... | 73/239 |
| 7,451,781 B2 * | 11/2008 | Carlson | .................... | 137/501 |
| 7,770,595 B2 * | 8/2010 | Kirchner et al. | .................... | 137/501 |

FOREIGN PATENT DOCUMENTS

WO    WO-2007-127949    11/2007

OTHER PUBLICATIONS

International Search Report and Written Opinion for PCT/US2011/054978; SKO FLO Industries, Inc.; mailed Feb. 15, 2012, 12 pages.

* cited by examiner

*Primary Examiner* — William McCalister

(74) *Attorney, Agent, or Firm* — Perkins Coie LLP

(57) ABSTRACT

A flow rate controller is disclosed that maintains constant flow rate with changes in pressure drop across the valve by maintaining a constant pressure drop across a restrictor with the aid of a spring balanced piston that mates a cone to a seat to dissipate the majority of pressure drop across the valve.

28 Claims, 6 Drawing Sheets

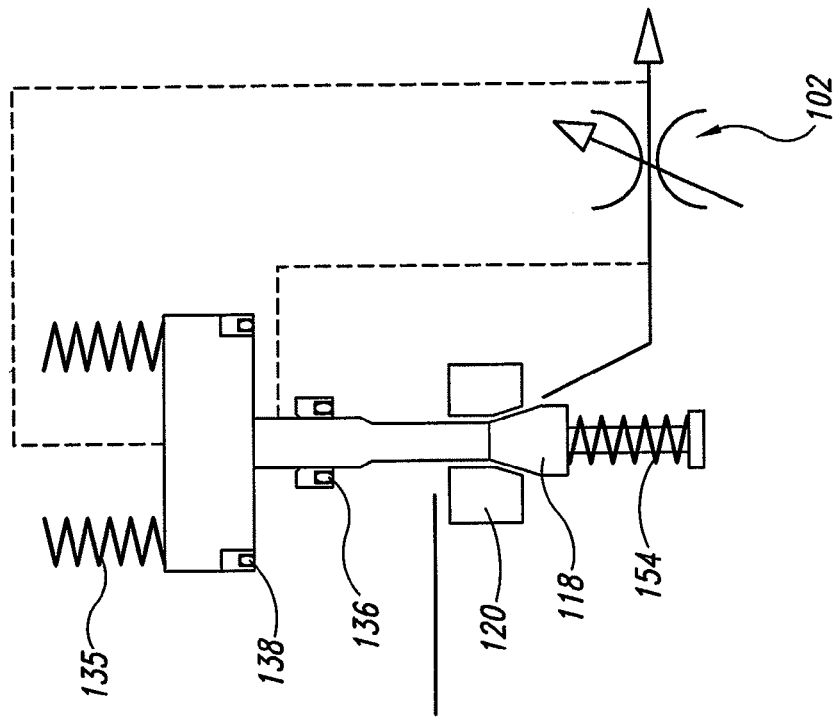
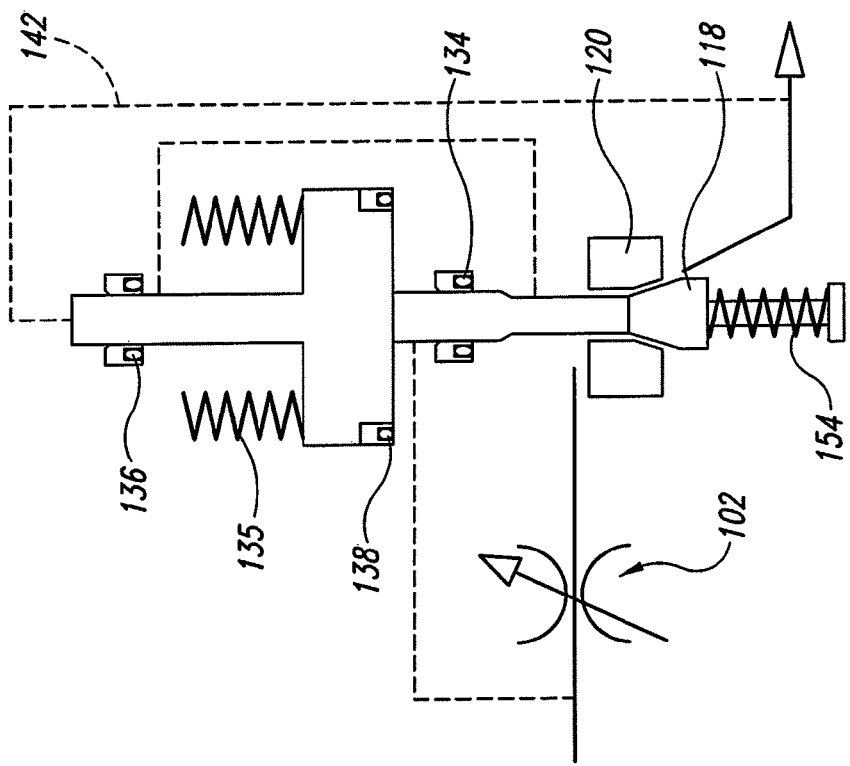

FLOW RATE CONTROLLER FOR HIGH FLOW RATES AND HIGH PRESSURE DROPS

CROSS REFERENCE TO RELATED APPLICATION

The present non-provisional patent application hereby claims priority to U.S. Provisional Patent Application No. 61/390,035, titled FLOW RATE CONTROLLER FOR HIGH FLOW RATES AND HIGH PRESSURE DROPS, and filed Oct. 5, 2010, and which is incorporated herein in its entirety by reference thereto.

TECHNICAL FIELD

Embodiments of the present invention are directed to flow rate controllers, and more particularly to flow rate controllers for high flow rates and high pressure drops.

BACKGROUND

Hydrate inhibitors such as methanol and glycol are often injected into oil and gas high pressure production lines. For hydrate inhibitor distribution lines, rate control valves are often used to distribute fluid from one pump to several injection points to reduce the cost of pumps, piping systems, and pump maintenance. Flow rates for these valves will range from approximately $1/10^{th}$ of a gallon per minute to up to eighty gallons per minute. In addition, wells can experience large pressure fluctuations during day-to-day operation.

Pressure compensated flow control valves are designed to maintain constant flow with changes in pressure drop across the device, wherein the flow passes to the underside of a throttling member, such as a mating cone and sharp edged seat (U.S. Pat. No. 6,662,823) and a sharp edged hollow cylinder (U.S. Pat. Nos. 4,250,915 and 5,642,752). In these flow control valves, the flow path is, as an example, over the throttle cone first and then through the mating seat, such that the valves are susceptible to inadequate control or inadvertent closure of the throttle upon a large pressure differential or a pressure spike in the fluid entering the valve. Accordingly, these pressure compensated valves are typically not designed to adequately handle large pressure drops across the valves.

U.S. Pat. Nos. 6,827,100 and 4,210,171 discloses control valves with fluid flow going under the seat first. These control valves, however, are not adequately balanced to handle large pressure drops across the valves or large, sudden pressure spikes (i.e., transient pressure spikes). As a result, the balance of these valves will become unstable with pressure spikes or large pressure drops across the valves.

Pressure balanced rate control valves, such as those disclosed in U.S. Pat. No. 4,893,649, Skoglund U.S. Pat. Nos. 5,234,025, and 6,932,107 are unique from other prior art pressure compensated rate controls because the ratio of the area balanced by the spring chamber is substantially larger than the area of the seat that dissipates the pressure drop. These pressure balanced rate control valves, however, have a configuration and flow direction such that the valves can go into a cyclic opening and closing sequence (sort of an on/off water hammer) with excessive pressure drops across the valve. This cyclic opening and closing can provide an undesirable harmonic cycling that will match the natural frequency of the piping supplying the valve.

A significant problem for conventional flow rate controllers is cavitation. Cavitation will typically occur in a valve trim if the fluid velocities are fast enough to cause the pressure at the velocity point to drop below the vapor pressure of the liquid. When pressure is dropped below vapor pressure it will create a collapsing bubble when the pressure is recovered. This collapsing bubble causes a point pressure load of up to 300,000 psi pressure on valve surfaces. This high contact pressure also causes an instantaneous heating at the collapsing bubble. The high heat and high contact pressure will erode the surfaces and will generate high frequency flow noises reverberating to the piping system. Cavitation and trim selection to avoid cavitation is described in ANSI/ISA-75.01-2002 "Flow Equations for Sizing Control Valves". There is a need for a flow rate controller that effectively eliminates cavitation across its operating conditions.

SUMMARY

A device is needed to maintain a substantially constant flow rate once set, notwithstanding changes in pressure drop across the device in excess of several thousand pounds per square inch, in order to maintain flow rate delivery due to the large day to day well-pressure fluctuations. This device must be able to withstand high pressure drops without experiencing cavitation and must be resilient so as to not shake the line due to vibration, which can be caused by a flow rate governing mechanism resonating with the distribution lines.

The present invention provides a flow rate controller that overcomes drawbacks of the prior art and that provides other benefits. In one embodiment, a flow rate controller is provided that maintains a substantially constant flow rate of liquid with pressure drops ranging between approximately 300 psi to over 15,000 psi across the valve.

The flow rate controller allows large pressure drops across the valve while effectively handling large transient pressure changes, such as pressure spikes in the fluid entering the controller, and reducing or eliminating cavitation conditions at throttling sections that would occur in conventional rate control devices. Accordingly, the flow rate controller of this present disclosure substantially extends the allowable pressure drop across the valve substantially without cavitation or before cavitation occurs. Extending the allowable pressure drop before cavitation also reduces and/or eliminates the noise emitted from the valve, thereby eliminating the need for hearing protection and/or noise suppression near the control valves.

The flow rate controller of at least one embodiment is also configured to eliminate shaking/resonance conditions that can occur in conventional spring compensated regulating devices when supplied by long sections of small diameter rigid steel lines without dampening systems, such as gas charged accumulators or flexible hose systems, to dissipate pressure pulsations.

BRIEF DESCRIPTION OF THE DRAWINGS

FIG. 7 is schematic representation of the flow rate controller of an alternate embodiment.

FIG. 8 is schematic representation of the flow rate controller of another embodiment.

DETAILED DESCRIPTION

The present disclosure describes one or more a flow rate controllers in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
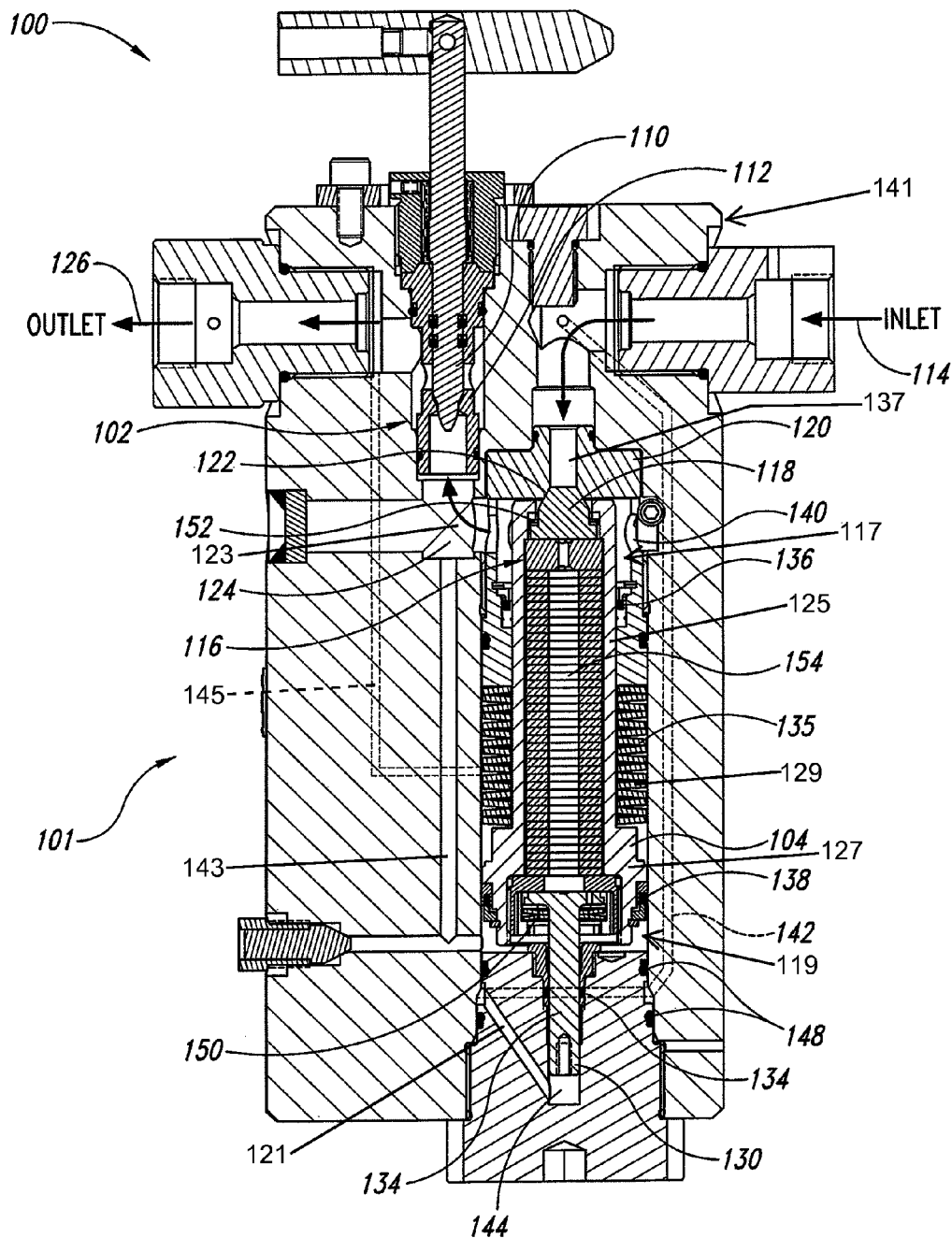
FIG. 1 is cross-sectional view of a flow rate controller in accordance with at least one embodiment of the present invention.

In accordance with one embodiment of the present disclosure with reference to FIG. 1, a pressure-independent flow rate controller 100 is provided that comprises a flow inlet 114 and a flow outlet 116 through which fluid flows, wherein fluid pressure at the flow inlet is an inlet pressure (P1) and the fluid pressure at the flow outlet is an outlet pressure (P3). An interior chamber 115 has first and second chamber portions 117 and 119, respectfully, and a balance channel 121 adjacent to the second chamber portion 119. An intermediate passageway 123 interconnects the flow outlet 116 to the first chamber portion 117. A piston 104 is slideably disposed in the interior chamber 115 and has first and second piston portions 145 and 147, respectively axially spaced apart from each other. A first seal member 136 is sealably connected to the first piston portion 125 and blocks fluid from moving past the piston 104 between the first chamber portion 107 eight and an intermediate space 129 between the first and second piston portions 125 and 127. A second seal member 138 is sealably connected to the second piston portion 127 and blocks fluid from moving between the intermediate space 129 and the second chamber portion 119. A piston biasing member 135 is in the intermediate space 129 between the first and second seal members 136 and 138. The intermediate space 139 is in fluid communication with the flow outlet 116, and the pressure of the fluid in the intermediate space 129 is substantially at the outlet pressure (P3). The size of the piston 104 and the effective areas acted upon by the fluid at the intermediate and outlet pressures (P2 and P3) are such that the piston spring and associated dynamic seals balance the opposing forces in the interior chamber.

The flow rate controller 100 has a throttling assembly 116 adjacent to the first chamber portion 117. The throttling assembly 116 includes a throttling seat 120 with a throttling channel 137 therethrough. The throttling channel 137 has a flow entrance that receives fluid from the flow inlet substantially at the inlet pressure (P1).

The throttling channel has a flow exit that directs fluid flowing therethrough to the first chamber portion. The throttling assembly 116 has a throttling member 118 moveably disposed adjacent to the first chamber portion 117, and the throttling member 118 is connected to the piston 104. The throttling member 118 has an end portion shaped to mate with the flow exit of the throttling seat. The end portion has a first area acted upon by the fluid flowing through the throttling channel substantially at the inlet pressure (P1) acts. The throttling member 118 is movable relative to the throttling seat 120 to regulate fluid flow through the throttling assembly 116. The throttling member 118 in an open position allows the fluid to flow into the first chamber portion. The fluid in the first chamber portion 117 and in the intermediate passageway 123 is at an intermediate pressure (P2), which is less than the inlet pressure (P1) and greater than the outlet pressure (P3). The intermediate passageway 123 is in fluid communication with the second chamber portion 118 and fluid in the second chamber portion is at the intermediate pressure (P2).

A balance member 130 is coupled to the piston 104 and is connected to the throttling member 118. The balance member 130 has a portion sealably extending into the balance channel 144 and has a fluid-acting surface with an area substantially equal to the first area of the end portion of the throttling member 118. The balance channel 114 is in communication with the fluid inlet, and the balance channel contains fluid at the inlet pressure (P1). The fluid pressure in the balance channel 144 acts on the fluid-acting surface to balance the fluid pressure acting on the end portion of the throttling member 118. A restriction assembly 102 is between the intermediate passageway 123 and the flow outlet 126. The restriction assembly 102 is adjustable between closed and open positions. The restrictor assembly 102 in the open position allows the fluid in the intermediate passageway (at the intermediate pressure (P2)) to flow at a selected constant flow rate into the flow at the outlet pressure (P3), wherein the selected constant flow rate is independent of a pressure differential between the outlet pressure (P3) and the inlet pressure (P1).

In one embodiment, a pilot passageway 142 interconnects the flow inlet 114 and the balance channel 121, wherein fluid in the pilot passageway channel is substantially at the inlet pressure (P1). The pilot passageway can extend through the throttling member and the balance member. The flow rate controller 100 can include a second pilot passageway 143 interconnecting the intermediate passageway 123 with the second chamber portion 119, wherein fluid in the second pilot passageway is substantially at the intermediate pressure (P2). The flow rate controller 100 can include a third pilot channel 145 interconnecting the flow outlet 126 to the intermediate space 129, wherein fluid in the pilot passageway is substantially at the outlet pressure (P3). The throttling member in one embodiment is a throttling cone with a tapered end portion facing the flow of fluid through the throttling seat, wherein the throttling cone configured to move away from the throttling seat upon a sudden increase in the inlet pressure, such as a pressure spike or a large transient pressure increase for a short duration, such as less than approximately 0.5 seconds. Typically a pressure spike or sudden pressure increase experienced by the controller 100 can last between a few milliseconds and one-half second. A throttle biasing member can be coupled to the throttling member so as to urge the throttling member toward the throttling seat. The throttle biasing member is compressible when the throttling member moves away from the throttling seat. The throttle biasing member can be radially inward and concentrically arranged with the piston biasing member. The piston biasing member can be positioned radially outward and concentrically arranged with at least a portion of the piston between the first and second sealed members.

The flow rate controller's piston can include a first piston portion with a first area acted upon by the fluid in the first chamber portion at the intermediate pressure (P2). The second piston portion has a second area acted upon by the fluid in the second chamber portion at the intermediate pressure (P2), and the first area is substantially equal to the second area. Accordingly, the opposing forces from the fluid at the intermediate pressure are balanced. One embodiment includes a piston guide disposed in the interior chamber and coupled to the first piston portion. The piston biasing member is disposed between the second piston portion and the piston guide, and the piston biasing member is compressible between the second piston portion and the piston guide.

Another embodiment of the present disclosure includes a constant rate flow rate controller comprising a flow inlet and a flow outlet through which fluid flows. The fluid pressure at the flow inlet is an inlet pressure (P1) and the fluid pressure at the flow outlet is an outlet pressure (P3). An interior chamber has first and second chamber portions and a balance channel adjacent to the second chamber portion. The first and second chamber portions contain a portion of the fluid at an intermediate pressure (P2). An intermediate passageway interconnects the flow outlet to the first chamber portion, and the intermediate passageway contains a portion of the fluid at the intermediate pressure (P2). A piston is slideably disposed in the interior chamber and has first and second piston portions axially spaced apart from each other. The piston has an internal area containing fluid at the intermediate pressure (P2).

An annular first seal member is sealably connected to the first piston portion and blocks fluid from moving past the first piston portion between the first chamber portion and an annular intermediate space between the first and second piston portions. The annular intermediate space is radially outward of the internal area of the piston, and this intermediate space contains a portion of the fluid at the outlet pressure (P3). An annular second seal member is sealably connected to the second piston portion and blocks fluid from moving between the annular intermediate space and the second chamber portion. An annular piston biasing member is in the annular intermediate space axially between the first and second seal members. The piston biasing member in the intermediate space is radially outward of a portion of the piston. The annular piston biasing member has an outer diameter (D1) and an inner diameter (D2), and the piston biasing member defines an annular area between D1 and D2. The annular piston biasing member balances the annular areas between D1 and D2 against the forces of the intermediate pressure (P2) acting on the piston and the opposing forces of the outlet pressure (P3) in the internal area acting against the piston.

The flow rate controller has a throttling seat with a throttling channel therethrough. The throttling channel has a flow entrance that receives the fluid from the flow inlet substantially at the inlet pressure (P1), and the throttling channel has a flow exit that directs fluid flowing therethrough to the first chamber portion. A throttling member is moveably disposed adjacent to the first chamber portion and is connected to the piston. The throttling member has an end portion shaped to mate with the flow exit of the throttling seat. The end portion has a first area acted upon by the fluid flowing through the throttling channel substantially at the inlet pressure (P1). The throttling member is movable relative to the throttling seat to regulate the flow through the throttling seat. The throttling member in the open position allows the fluid to flow into the first chamber portion at the intermediate pressure (P2).

A balance member is coupled to the piston and is connected to the throttling member. The balance member has a portion sealably extending into the balance channel and has a fluid-acting surface with an area substantially equal to the area of the end portion of the throttling member acted upon by the fluid substantially at the inlet pressure (P1). The balance channel contains a portion of the fluid substantially at the inlet pressure (P1) that acts on the fluid-acting surface and balances opposing the fluid pressure acting on the end portion of the throttling member. A restriction assembly is between the intermediate passageway and the flow outlet. The restriction assembly is adjustable between closed and open positions. The restrictor assembly in the open position allows the fluid in the intermediate passageway to flow at a selected constant flow rate into the flow outlet at the outlet pressure (P3), wherein the selected constant flow rate is independent of a pressure differential between the outlet pressure (P3) and the inlet pressure (P1) because of the pressure balance across the area bounded by D1-D2.

In another embodiment, a flow rate controller comprises a body with a flow inlet and a flow outlet, wherein fluid pressure at the flow inlet is an inlet pressure (P1) and fluid pressure at the flow outlet is an outlet pressure (P3), which is less than the inlet pressure (P1). The body has an interior chamber with a top portion, an intermediate portion, and a bottom portion. The body has an inlet passageway in fluid communication with the flow inlet and the top portion of the interior chamber. The body has an intermediate passageway in fluid communication with the intermediate portion. A pilot passageway is in fluid communication with the flow inlet and the bottom portion of the interior chamber.

A piston is slideably disposed in the interior chamber and is axially movable within the interior chamber intermediate the top and bottom chamber portions. At least a portion of the piston has an outer diameter and is in sealed engagement with chamber walls of the body defining at least a portion of the interior chamber. An annular piston biasing member is positioned about the piston and provides a balancing force to balance opposing forces from the intermediate pressure (P2) and the outlet pressure (P3) acting on the piston. A throttling seat is securely disposed adjacent to the interior chamber adjacent to the top chamber portion. The throttling seat has a throttling channel therethrough, wherein a top portion of the throttling channel is in direct communication with the inlet passageway. The throttling channel has a tapered bottom opening facing toward the piston.

A throttling cone is moveably disposed in the interior chamber and is supported by a top portion of the piston. The throttling cone has a tapered top portion shaped to mate with the tapered bottom opening of the throttling seat. The throttling cone is movable relative to the throttling seat to restrict flow through the throttling seat. The throttling cone's tapered top portion in the open position is spaced apart from the throttling seat at the tapered bottom opening and allows the fluid to flow between the throttling seat and the throttling cone and to exit the throttling channel at the intermediate pressure (P2). The throttling cone has a top end portion with a first diameter and a bottom end portion opposite the top end portion and facing away from the throttling seat.

A push rod is disposed in a bottom portion of the interior chamber and is connected to a bottom end portion of the piston. The push rod has a bottom end portion slideably disposed in a channel connected to the bottom portion of the interior chamber. The bottom end portion of the push rod has a second diameter substantially equal to the diameter of the throttling cone's tapered top portion. The channel is in fluid communication with the pilot passageway, whereby pressure of the fluid engaging the bottom end portion of the push rod substantially equals the inlet pressure (P1).

A restriction assembly is intermediate the outlet passageway and the flow outlet. The restriction assembly comprises a valve seat and a restrictor axially adjustable relative to the valve seat between closed and open positions. The restrictor in the closed position blocks the fluid in the intermediate passageway from flowing to the flow outlet. The restrictor in the open position allows the fluid in the outlet passageway to flow between the restrictor and valve seat at a selected constant flow rate into the outlet passageway at the outlet pressure (P3), wherein the selected constant flow rate is independent of a pressure differential between the outlet pressure (P3) and the inlet pressure (P1).

In yet another embodiment, a flow rate controller provides a flow of fluid at a constant flow rate independent of a fluid pressure differential across the controller. The flow rate controller comprises a body with a flow inlet and a flow outlet, wherein fluid pressure at the flow inlet is an inlet pressure (P1) and the fluid pressure at the flow outlet is an outlet pressure (P3). The outlet pressure (P3) is less than the inlet pressure (P1). The body has an interior chamber with opposing first and second portions and a push-rod channel adjacent to the second portion. The body has an inlet passageway connected to the flow inlet, an outlet passageway connected to the flow outlet, and an intermediate passageway interconnecting the outlet passageway to the first portion of the interior chamber. A piston is slideably disposed in the interior chamber and is axially movable within the interior chamber. The piston has a first piston portion axially spaced apart from a second piston portion by an intermediate space. The second piston portion is closer to the second portion of the interior chamber than the first piston portion.

A first dynamic seal is connected to the first piston portion and sealably separates the intermediate space from the first portion of the interior chamber. The first dynamic seal prevents fluid from moving past the piston between the intermediate space and the first portion of the interior chamber. A second dynamic seal is connected to the second piston portion and sealably separates the intermediate space from the second portion of the interior chamber. The second dynamic seal prevents fluid from moving between the intermediate space and the second portion of the interior chamber past the piston. A piston biasing member is in the intermediate space and is coupled to the piston between the first and second dynamic seal. The piston and piston biasing member are shaped and sized so the piston biasing member balances opposing forces from the fluid at the intermediate and outlet pressures (P2 and P3) acting on the piston and seals. In one embodiment, the piston biasing member is an annular member with an outer diameter (D1) and an inner diameter (D2). In one embodiment the outer diameter D1 is substantially the same as the outer diameter of one of the dynamic seals, and the inner diameter D2 is substantially the same as the inner diameter of the other one of the dynamic seals.

A throttling seat is securely connected to the body adjacent to the first portion of the interior chamber. The throttling seat has a throttling channel therethrough in direct communication with the flow inlet passage and with the first portion of the interior chamber. The throttling channel has a flow entrance and tapered exit opening defining a flow exit and facing toward the first portion of the interior chamber. The throttling seat receives the flow of fluid from the flow inlet passage through the flow entrance, and the flow of fluid exits through the flow exit and passes into the first portion of the interior chamber. A throttling cone is moveably disposed in the first portion of the interior chamber and is supported by the first portion of the piston. The throttling cone has a tapered portion shaped to mate with the tapered exit opening of the throttling seat. The throttling cone is movable relative to the throttling seat to regulate fluid flow therebetween. The tapered portion in an open position is spaced apart from the throttling seat and allows the fluid to flow between the throttling seat and the throttling cone and enter the first portion of the interior chamber at an intermediate pressure (P2) less than the inlet pressure (P1) and greater than the outlet pressure (P3). The fluid pressure of the fluid in the first portion of the interior chamber between the throttling seat and the first seal member is approximately the intermediate pressure (P2).

The throttling cone has a tapered portion with a first fluid-acting area defined by a diameter, D4. A push rod assembly has a push rod connected to the second end portion of the piston and has a rod portion extending into the push-rod channel. A seal member is sealably engaging the rod portion separating the push rod channel from the second portion of the interior chamber. The rod portion has a second fluid-acting area defined by a diameter, D3, which is substantially equal to diameter D4 of the throttling cone. A first pilot passageway interconnects the inlet channel to the push rod channel. Fluid in the first pilot channel and in the push rod channel acting against the rod portion is substantially at the inlet pressure (P1). The fluid pressure acting on the tapered portion of the throttling cone is also substantially at the inlet pressure (P1), so the opposing forces are balanced by fluid pressure acting on the rod portion in the push rod channel.

A second pilot passageway interconnects the intermediate passageway with the second portion of the interior chamber. Fluid in the second pilot channel and in the second portion of the interior chamber is substantially at the intermediate pressure (P2). A third pilot channel interconnects the outlet channel to the intermediate space of the interior chamber between the first and second seal members. Fluid in the third pilot channel and in the intermediate space of the interior chamber between the first and second seal members is substantially at the outlet pressure (P3). A restriction assembly is intermediate the intermediate passageway and the flow outlet. The restriction assembly includes a valve seat and a restrictor axially adjustable relative to the valve seat between closed and open positions. The restrictor in the closed position blocks the fluid in the outlet passageway from flowing to the flow outlet.

The restrictor in the open position allows the fluid in the outlet passageway to flow between the restrictor and valve seat at a selected constant flow rate into the outlet passageway at the outlet pressure (P3), wherein the selected constant flow rate is independent of a pressure differential between the outlet pressure (P3) and the inlet pressure (P1). Accordingly, fluid at pressure P2 is on one side of the piston and pressure P3 is on the piston spring side of the piston. The piston spring balances the area contained by the annular area bound by D1 and D2 via the dynamic seals. Further, the area of the pressure P1 working against the throttling cone is bound by approximately the area contained by D4 and is balanced by the same pressure P1 working against the end of the push rod sealed by a dynamic seal. The cone springs 6 and the inside of the piston 104 are bathed by fluid at pressure P2. A constant pressure drop between P2 and P3 across the restrictor is governed regardless of change in pressure drop between P1-P3 across valve by the balance of P2 acting against P3 on the area contained by D1-D2 in the interior chamber. As the pressure drop between P1 and P3 across the valve increases P1-P3, the piston will move toward the seat throttling flow to the governed constant value to maintain the pressure balance across the area bound by D1-D2. This constant pressure governs the pressure drop across the restrictor.

Figure 3:
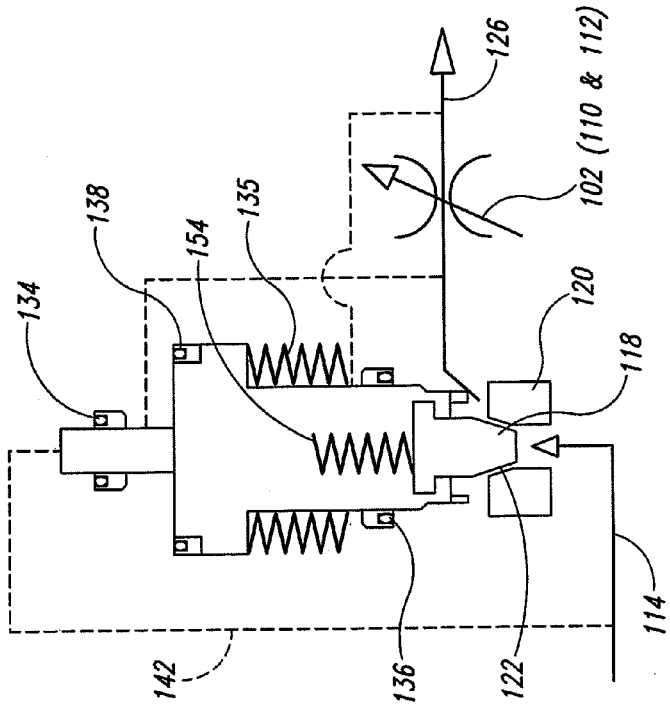
FIG. 3 is a schematic representation of the flow rate controller of FIG. 1.
Figure 2:
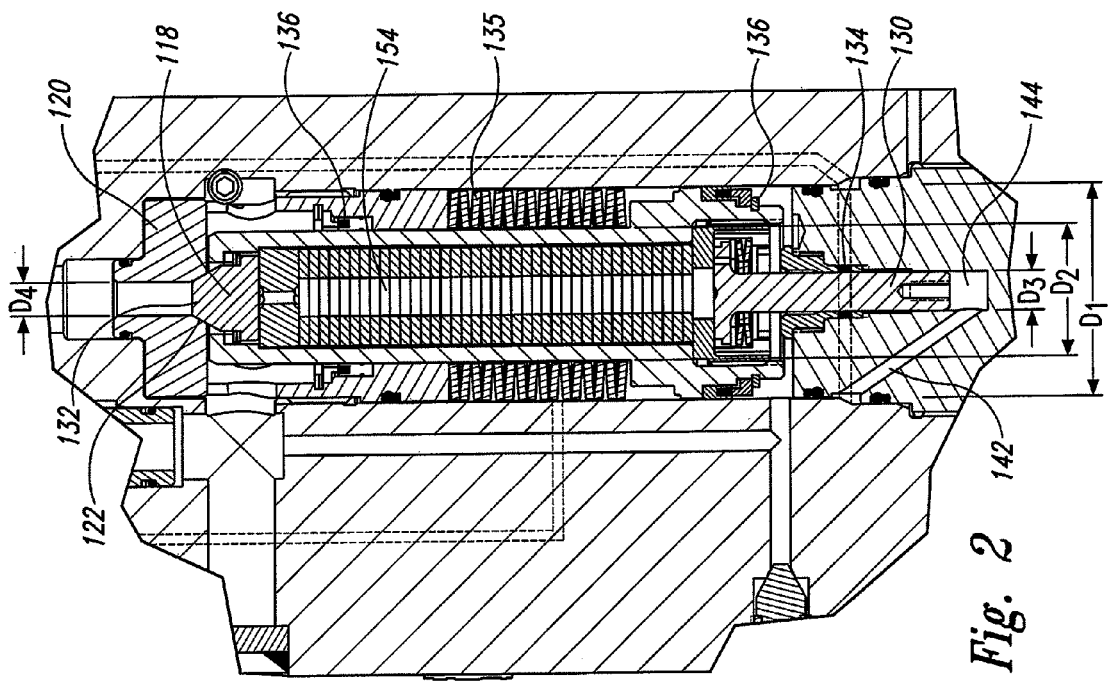
FIG. 2 is an enlarged portion of the cross-sectional view of FIG. 1 showing diameters of component in the piston and chamber area.
Figure 4:
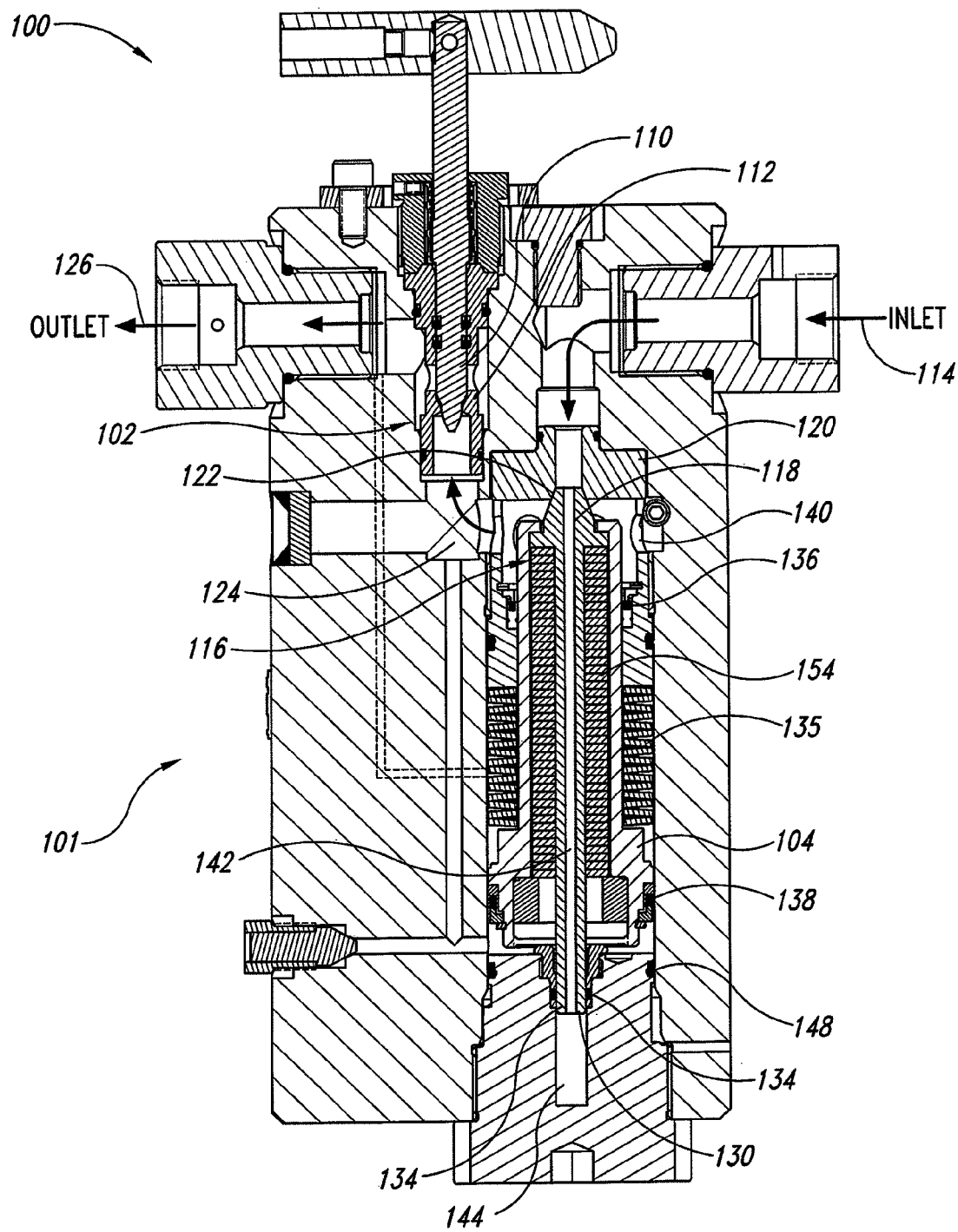
FIG. 4 is cross-sectional view of a flow rate controller in accordance with another embodiment of the present invention.
Figure 6:
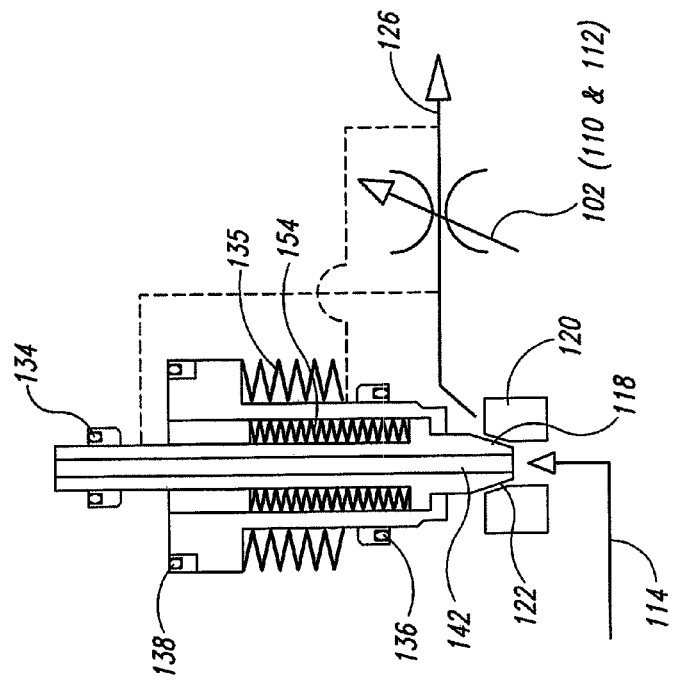
FIG. 6 is a schematic representation of the flow rate controller of FIG. 4.
Figure 5:
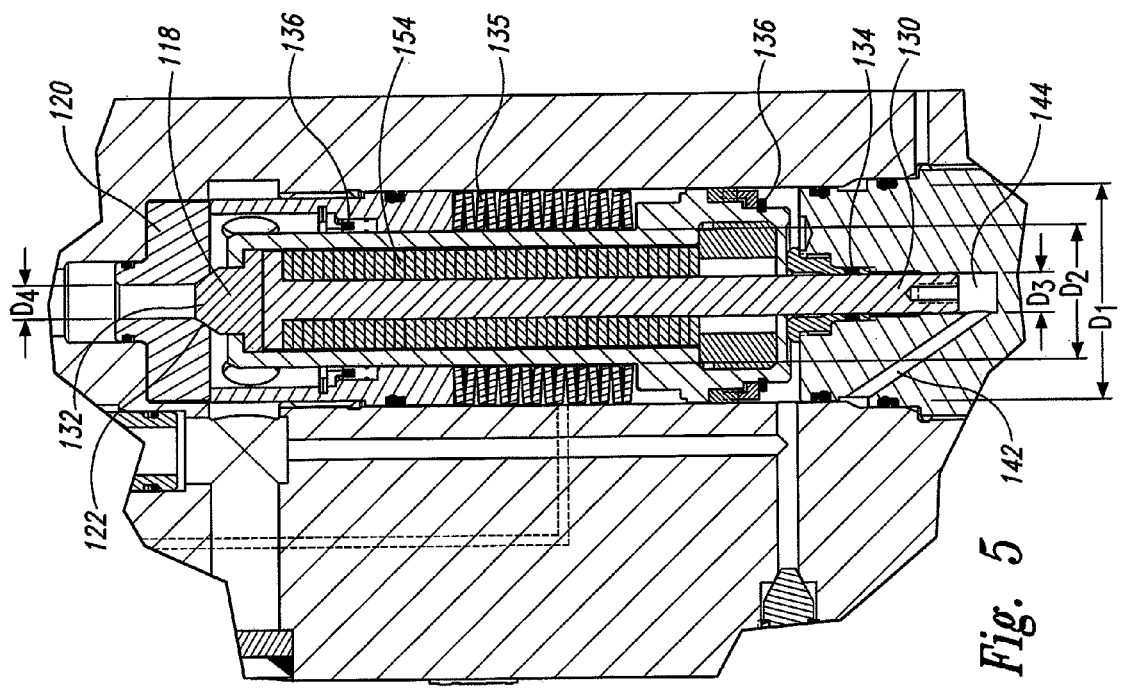
FIG. 5 is an enlarged portion of the cross-sectional view of FIG. 4 showing diameters of component in the piston and chamber area.

Turning now to the Figures, FIGS. 1 and 2 are cross-sectional views of a flow rate controller 100 in accordance with a first embodiment of the present invention, and FIG. 3 is a schematic representation of the flow rate controller 100 of FIG. 1. FIGS. 4 and 5 are cross-sectional views of an alternate second embodiment of the flow rate controller, and FIG. 6 is a schematic representation of the flow rate controller of FIG. 4. Both of these embodiments utilize the same principle of operation to achieve the above cited improvements with minor differences in construction. Both embodiments maintain constant flow rate with changes in pressure drop across the valve 101 by maintaining a constant pressure drop across a restrictor 102 with the aid of a spring balanced piston 104 that mates a cone 118 to a seat 120 to dissipate the majority of pressure drop across the valve 101. If the pressure drop across the restrictor 102 remains constant with wide fluctuations in pressure drop across the valve 101, flow rate will remain constant. In the illustrated embodiments, the restrictor 102 is comprised of a needle trim 110 and needle 112 which provides a wide range of fluid restriction. In alternate embodiments, the restrictor 102 can be comprised of a ball valve, gate valve or multitude of variable or fixed restriction devices. The restriction is used to adjust the flow rate set point of the device 100.

For both embodiments, fluid enters the valve inlet 114 at a first pressure (P1) and flows through a throttling valve 116 that dissipates the majority of pressure drop across the valve. This throttling valve 116 in the illustrated embodiment is comprised of the mating cone 118 and tapered seat 120 typically made of hard materials such as carbide, ceramic or satellite but is not restricted to these materials. It is important to note that, in the illustrated embodiment, the fluid first enters the throttling valve 116 through the tapered seat 120 before reaching the mating cone 118 (i.e., the fluid enters from the underside of the throttling valve 116). If a pressure spike was experienced at the valve inlet 114, the cone 118 would be moved back allowing the pressure spike to be dissipated. Accordingly, the flow rate controller 100 uses the larger area of the piston chamber and allows the flow to come under the seat first to dissipate transient pressure spikes with a delayed response in doing so. After the fluid moves through the throttling section 122 (between the seat 120 and the cone 118) at a second pressure P2, the fluid travels to the inlet 124 of the needle restrictor 102, still substantially at the second pressure (P2), then through the needle restrictor 102 to the outlet 126 of the valve 101 at a third pressure (P3).

The throttling cone 118 for the illustrated embodiments is supported by the piston 104 that has a push rod 130 on the opposing end of the piston 104. This push rod 130 is approximately the same diameter D4 (FIGS. 2 and 4) of the small end 132 of the cone 118 and is sealed at one end by a dynamic seal 134, so the end of the push rod 130 communicates the same pressure with the small end 132 of the tapered cone 118. For both embodiments, the tapered cone 118 has a shoulder on the inside diameter of piston 104 which can slide radially to align with the mating seat 120. One purpose of the push rod 130 is to balance the force created by the inlet pressure applied to the small end 132 of the cone 118.

Piston 104 supports piston springs 135 around it is outside diameter. These piston springs 135 govern pressure drop across the needle restriction 102 by applying a force against an area defined by the two dynamic seals 136 and 138 on the outside diameters of the piston 104. While the illustrated embodiment uses dynamic seals, other embodiments can use other seals, such as O-rings, bellows, labyrinth-type seals, etc., to engage the piston and to separate an upper chamber portion, an intermediate chamber portion and a lower chamber portion. A piston guide 140 supports dynamic seal 136 and retains seat 120 as well as guides the piston 104. As shown in FIGS. 2 and 4, the piston 104 and the two dynamic seals 138 and 136 are arranged to define an outer diameter D1 and an inner diameter D2, respectively.

In the first embodiment shown in FIGS. 1 and 2, a pilot hole 142 extends between the inlet 114 and the bottom portion of the balance channel 144 that receives the push rod 130. In the second embodiment shown in FIGS. 4 and 5, a central pilot hole 146 extends through the center of the tapered cone 118 to communicate pressure (P1) from the inlet to the end of the push rod 130. This center pilot hole 146 eliminates the need for a pilot passage 140 through the body. The center pilot hole 146 also eliminates the need for a static seal 148, rod springs 150, and opposing cone springs 152, as provided in the first embodiment and shown in FIGS. 1 and 2. Both designs use cone springs 154 to maintain contact between the cone's shoulder and the piston's shoulder during flow regulation. The push rod 130 is directly connected to the cone 118 in the second embodiment (FIGS. 3 and 4), which reduces the required force that the cone springs 154 must apply to regulate flow at high pressure drops. Accordingly, the balance between the push rod 130 and the small end of the cone, both subject to P1, allows the cone springs 154 to exert minimal force to keep the cone from recoiling into the piston assembly. In one embodiment, the controller is configured so the cone springs will not need to flex any more than a preset level during flow regulation. This allows the cone 118 to self-align to the seat 120 to throttle the flow over the full range of the valve.

If the included angle of taper on cone 118 and seat 120 are reduced, the length of the cone shaped annular passage is increased allowing cone 118 and seat 120 to be further away from each other than if they had a shorter mating land. The increased annular distance produces slower fluid velocities between the tapered surfaces of the cone 118 and seat 120 which cause less fluid erosion and a trim that is subjected to reduced cavitation while throttling the same flow rate and pressure drop as a shorter mating land.

When flow is shut off completely by closing the needle 110 against the needle trim 112 the cone springs 154 allow the shoulder of the cone 118 to recoil from the shoulder of the piston 104 to reduce the force that can be transmitted from the pressure drop across the valve applied to the area of the piston 104 bound by the dynamic seals 136 and 138 by allowing the piston 104 to compress the piston springs 135 supporting this load. Without this recoiling action, the cone 118 would subject the seat 120 to yielding stress created by the tapers meeting and being driven together by thrust from the pressure area of the piston which is several times greater than the area of the seat.

To maintain constant flow rate with drops in excess of two thousand pounds per square inch, changes in effective area of the throttling sections must remain insignificant compared to the area that is constrained by the dynamic seals 136 and 138. If imbalances occur, the flow rate will increase or decrease with increasing pressure drop across the valve. As the cone 118 strokes into seat 120 the effective area of the cone 118 and seat 120 will change due to the pressure loss distribution of fluid passing around the cone 118 and seat 120. The area at the end of the push rod 130 is constant and is an approximate average of the range in area of the cone 118 and seat 120. As the land distance of the mating cone 118 and seat 120 are increased to reduce the fluid velocities the effective area, changes in seat area with piston movement become more pronounced and require the larger area of the piston to make these changes less significant.

Figure 9:
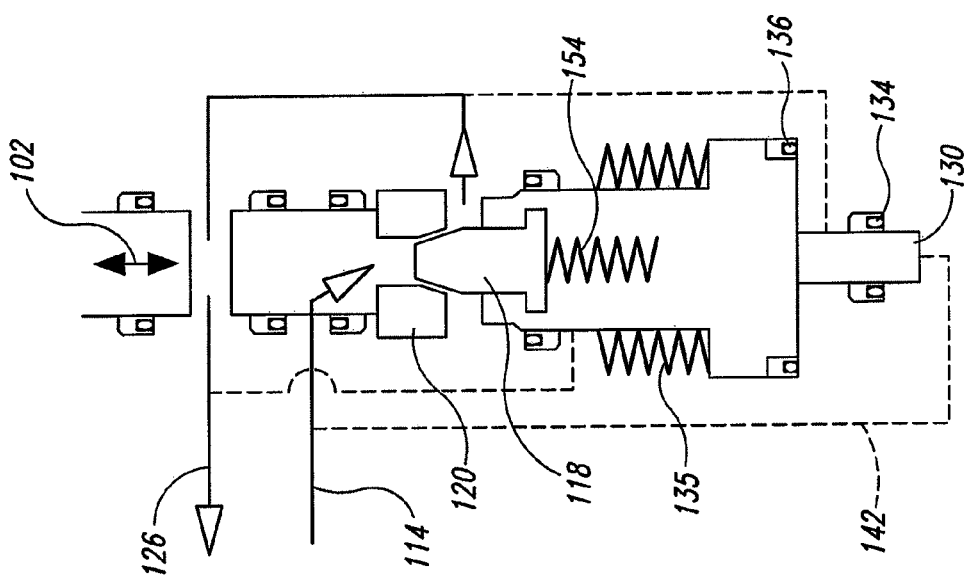
FIG. 9 is schematic representation of the flow rate controller of yet another embodiment.

FIGS. 7-9 are schematic representations of flow rate controllers 100 of alternate embodiments that operate in a manner substantially similar the devices as described above.

Figure 10:
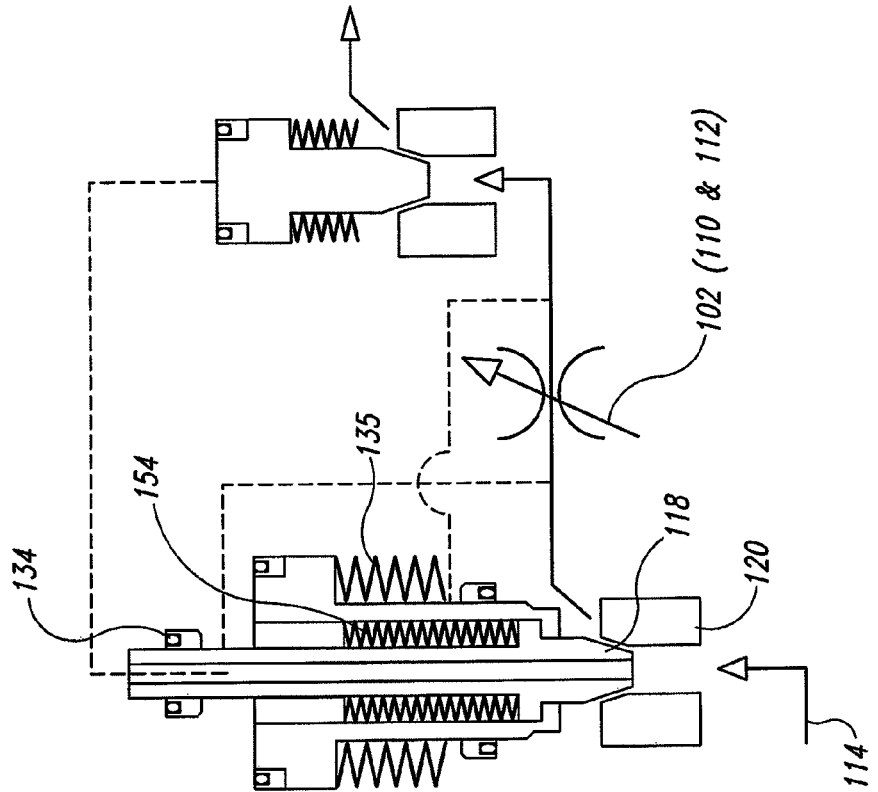
FIG. 10 is schematic representation of the flow rate controller of an alternate embodiment.

FIG. 10 is schematic representation of the flow rate controller 100 of an alternate embodiment. The valve mechanism of FIGS. 4 and 5 has the second throttling piston to govern pressure drop across the first cone and needle/trim combined. This alternate embodiment increases the allowable pressure drop across the valve for both cavitation and fluid erosion concerns. In this embodiment the flow rate is going under the cone 118 then through the seat 120. At least one of the advantages of this design over conventional designs is that the under then over design naturally arrests harmonics of seats closing causing water hammer surges then opening to attempt to maintain flow. The under then over trim also allows for a more efficient (longer mating taper) throttling seat 120 and cone 118 since the area effect of the mating cone 118 and seat 120 are not as critical to fight pressure fluctuation harmonics.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A pressure-independent flow rate controller, comprising:
a flow inlet and a flow outlet through which fluid flows, wherein fluid pressure at the flow inlet is an inlet pressure (P1) and the fluid pressure at the flow outlet is an outlet pressure (P3);
an interior chamber with first and second chamber portions and a balance channel adjacent to the second chamber portion;
an intermediate passageway interconnecting the flow outlet to the first chamber portion;
a piston slideably disposed in the interior chamber and having first and second piston portions axially spaced apart from each other;
a first seal member sealably connected to the first piston portion and blocking fluid from moving past the piston between the first chamber portion and an intermediate space between the first and second piston portions;
a second seal member sealably connected to the second piston portion and blocking fluid from moving between the intermediate space and the second chamber portion;
a piston biasing member in the intermediate space between the first and second seal members, the intermediate space being in fluid communication with the flow outlet and pressure of the fluid in the intermediate space being substantially at the outlet pressure (P3);
a throttling seat with a throttling channel therethrough, the throttling channel having a flow entrance that receives fluid from the flow inlet substantially at the inlet pressure (P1), the throttling channel having a flow exit that directs fluid flowing therethrough to the first chamber portion;
a throttling member moveably disposed in the first chamber portion and connected to the piston, the throttling member having an end portion shaped to mate with the flow exit of the throttling seat, the end portion having a first area against which fluid flowing through the throttling channel substantially at the inlet pressure acts, the throttling member being movable relative to the throttling seat, the throttling member allows the fluid to flow into the first chamber portion, wherein fluid in the first chamber and in the intermediate passageway is at an intermediate pressure (P2) less than the inlet pressure (P1) and greater than the outlet pressure (P3), and wherein the intermediate passageway is in fluid communication with the second chamber portion and fluid in the second chamber portion is at the intermediate pressure (P2);
a balance member coupled to the piston and connected to the throttling member, the balance member having a portion extending into the balance channel and having a fluid-acting surface with an area substantially equal to the first area of the end portion of the throttling member, the balance channel being in communication with the fluid inlet and containing fluid at the inlet pressure (P1) that acts on the fluid acting surface to balance the fluid pressure acting on the end portion of the throttling member; and
a restriction assembly between the intermediate passageway and the flow outlet, the restriction assembly being adjustable between closed and open positions, the restrictor assembly in the open position allows the fluid in the intermediate passageway to flow at a selected constant flow rate into the flow at the outlet pressure (P3), wherein the selected constant flow rate is independent of a pressure differential between the outlet pressure (P3) and the inlet pressure (P1).

2. The flow rate controller of claim 1, further comprising a pilot passageway interconnecting the flow inlet and the balance channel, wherein fluid in the pilot passageway channel is substantially at the inlet pressure (P1).

3. The flow rate controller of claim 2 wherein the pilot passageway extends through the throttling member and the balance member.

4. The flow rate controller of claim 1, further comprising a pilot passageway interconnecting the intermediate passageway with the second chamber portion, wherein fluid in the pilot passageway is substantially at the intermediate pressure (P2).

5. The flow rate controller of claim 1, further comprising a pilot channel interconnecting the flow outlet to the intermediate space, wherein fluid in the pilot passageway is substantially at the outlet pressure (P3).

6. The flow rate controller of claim 1 wherein the throttling member is a throttling cone with a tapered end portion facing the flow of fluid through the throttling seat, wherein the throttling cone is configured to move away from the throttling seat upon a sudden increase in the inlet pressure to dissipate the sudden pressure increase with a delayed response.

7. The flow rate controller of claim 1, further comprising a throttle biasing member coupled to the throttling member and urging the throttling member toward the throttling seat, the throttle biasing member being compressible when the throttling member moves away from the throttling seat.

8. The flow rate controller of claim 1, further comprising a seal interconnecting a portion of the balance member and the balance channel, the seal separating the fluid in the balance channel at the inlet pressure (P1) from the fluid in the second chamber portion at the intermediate pressure (P2).

9. The flow rate controller of claim 1 wherein the piston biasing member is radially outward and concentrically arranged with at least a portion of the piston.

10. The flow rate controller of claim 1 wherein the first piston portion has a first area against which the fluid in the first chamber portion at the intermediate pressure (P2) acts, and the second piston portion has a second area against which the fluid in the second chamber portion at the intermediate pressure (P2) acts, wherein the first area is substantially equal to the second area.

11. The flow rate controller of claim 1, further comprising a piston guide disposed in the interior chamber and coupled to the first piston portion, the piston biasing member disposed between the second piston portion and the piston guide, the piston biasing member being compressible between the second piston portion and the piston guide.

12. A constant rate flow rate controller, comprising:
a flow inlet and a flow outlet through which fluid flows, wherein fluid pressure at the flow inlet is an inlet pressure (P1) and the fluid pressure at the flow outlet is an outlet pressure (P3);
an interior chamber with first and second chamber portions and a balance channel adjacent to the second chamber portion, the first and second chamber portions containing a portion of the fluid at an intermediate pressure (P2), wherein the intermediate pressure (P2) is less than the inlet pressure (P1) and greater than the outlet pressure (P3);
an intermediate passageway interconnecting the flow outlet to the first chamber portion, the intermediate passageway containing a portion of the fluid at the intermediate pressure (P2);
a piston slideably disposed in the interior chamber and having first and second piston portions axially spaced apart from each other, the piston having an internal area containing fluid at the intermediate pressure (P2);
an annular first seal member sealably connected to the first piston portion and blocking fluid from moving past the first piston portion between the first chamber portion and an annular intermediate space between the first and second piston portions, wherein the annular intermediate space is radially outward of the internal area of the piston, the intermediate space containing a portion of the fluid at the outlet pressure (P3);
an annular second seal member sealably connected to the second piston portion and blocking fluid from moving between the annular intermediate space and the second chamber portion;
an annular piston biasing member in the annular intermediate space axially between the first and second seal members and radially outward of a portion of the piston, the annular piston biasing member having an outer diameter (D1) and an inner diameter (D2), and the piston biasing member defines an annular area between D1 and D2, the annular piston biasing member balancing the annular areas between D1 and D2 against the forces of the intermediate pressure (P2) acting on the piston and the opposing forces of the outlet pressure (P3) in the internal area acting against the piston;
a throttling seat with a throttling channel therethrough, the throttling channel having a flow entrance that receives the fluid from the flow inlet substantially at the inlet pressure (P1), the throttling channel having a flow exit that directs fluid flowing therethrough to the first chamber portion;
a throttling member moveably disposed in the first chamber portion and connected to the piston, the throttling member having an end portion shaped to mate with the flow exit of the throttling seat, the end portion having a first area against which the fluid flowing through the throttling channel acts substantially at the inlet pressure (P1), the throttling member being movable relative to the throttling seat, the throttling member allows the fluid to flow into the first chamber portion at the intermediate pressure (P2);
a balance member coupled to the piston and connected to the throttling member, the balance member having a portion extending into the balance channel and having a fluid-acting surface with an area substantially equal to the first area of the end portion of the throttling member, the balance channel containing a portion of the fluid at the inlet pressure (P1) that acts on the fluid acting surface and balances opposing the fluid pressure at the inlet pressure (P1) acting on the end portion of the throttling member; and
a restriction assembly between the intermediate passageway and the flow outlet, the restriction assembly being adjustable between closed and open positions, the restrictor assembly in the open position allows the fluid in the intermediate passageway to flow at a selected constant flow rate into the flow at the outlet pressure (P3), wherein the selected constant flow rate is independent of a pressure differential between the outlet pressure (P3) and the inlet pressure (P1) because of the pressure balance across the area bounded by D1-D2.

13. The flow rate controller of claim 12, further comprising a pilot passageway interconnecting the flow inlet and the balance channel, wherein fluid in the pilot passageway channel is substantially at the inlet pressure (P1).

14. The flow rate controller of claim 12, further comprising a pilot passageway interconnecting the intermediate passageway with the second chamber portion, wherein fluid in the pilot passageway is substantially at the intermediate pressure (P2).

15. The flow rate controller of claim 12, further comprising a pilot passageway interconnecting the flow outlet to the intermediate space, wherein fluid in the pilot passageway is substantially at the outlet pressure (P3).

16. The flow rate controller of claim 12 wherein the throttling member moves away from the throttling seat position upon a spike in the inlet pressure (P1).

17. The flow rate controller of claim 12, further comprising a throttle biasing member compressible when the throttling member moves away from the throttling seat, the throttle biasing member urges the throttling member toward the throttling seat.

18. A flow rate controller, comprising:
a body with a flow inlet and a flow outlet, wherein fluid pressure at the flow inlet is an inlet pressure (P1) and fluid pressure at the flow outlet is an outlet pressure (P3) less than the inlet pressure, the body having an interior chamber with a top portion, an intermediate portion, and a bottom portion, the body having an inlet passageway in fluid communication with the flow inlet and the top portion of the interior chamber; and the body having an outlet passageway in fluid communication with the intermediate portion;
a pilot passageway in fluid communication with the flow inlet and the bottom portion of the interior chamber;
a piston slideably disposed in the interior chamber and axially movable within the interior chamber intermediate the top and bottom portions, at least a portion of the piston having an outer diameter and being in sealed engagement with chamber walls of the body defining at least a portion of the interior chamber;
an annular piston biasing member positioned about the piston and providing a balancing force to balance opposing forces from the intermediate pressure and the outlet pressure acting on the piston;
a throttling seat securely disposed in the interior chamber adjacent to the top portion, the throttling seat having a throttling channel therethrough, wherein a top portion of the throttling channel is in direct communication with the inlet passageway, and the throttling channel has a tapered bottom opening facing toward the piston;
a throttling cone moveably disposed in the interior chamber and supported by a top portion of the piston, the throttling cone having a tapered top portion shaped to mate with the tapered bottom opening of the throttling seat; the throttling cone being movable relative to the throttling seat, the tapered top portion is spaced apart from the throttling seat at the tapered bottom opening and allows the fluid to flow between the throttling seat and the throttling cone and exit the throttling channel to the outlet passageway at an intermediate pressure (P2) less than the inlet pressure (P1) and greater than the outlet pressure (P3), the throttling cone having a top end portion with a first diameter, and a bottom end portion opposite the top end portion and facing away from the throttling seat;

a push rod disposed in a bottom portion of the interior chamber and connected to a bottom end portion of the piston, the push rod having a bottom end portion slideably disposed in a channel connected to the bottom portion of the interior chamber, the bottom end portion of the push rod having a second diameter substantially equal to the first diameter of the throttling cone; the channel being in fluid communication with the pilot passageway, whereby pressure of the fluid engaging the bottom end portion of the push rod substantially equals the inlet pressure (P1); and a restriction assembly intermediate the outlet passageway and the flow outlet, the restriction assembly comprises a valve seat and a restrictor axially adjustable relative to the valve seat between closed and open positions, the restrictor in the closed position blocks the fluid in the outlet passageway from flowing to the flow outlet, and the restrictor in the open position allows the fluid in the outlet passageway to flow between the restrictor and valve seat at a selected constant flow rate into the outlet passageway at the outlet pressure (P3), wherein the selected constant flow rate is independent of a pressure differential between the outlet pressure (P3) and the inlet pressure (P1).

19. The flow rate controller of claim 18, further comprising a throttle biasing member coupled to the throttling cone and compressible when the throttling cone moves away from the throttling seat.

20. The flow rate controller of claim 18 wherein the piston biasing member is disposed between a portion of the piston and the chamber walls of the internal chamber.

21. The flow controller of claim 18, further comprising a plurality of dynamic seals sealably connected to the piston and disposed on opposing ends of the intermediate portion of the interior chamber, wherein fluid between the dynamic seals is at the fluid outlet pressure (P3).

22. A flow rate controller for providing a flow of fluid at a constant flow rate independent of a fluid pressure differential across the controller, comprising:

a body with a flow inlet and a flow outlet, wherein fluid pressure at the flow inlet is an inlet pressure (P1) and the fluid pressure at the flow outlet is an outlet pressure (P3), wherein the outlet pressure (P3) is less than the inlet pressure (P1), the body having an interior chamber with opposing first and second portions and a push-rod channel adjacent to the second portion, the body having an inlet passageway connected to the flow inlet, an outlet passageway connected to the flow outlet, and an intermediate passageway interconnecting the outlet passageway to the first portion of the interior chamber;

a piston slideably disposed in the interior chamber and axially movable within the interior chamber, the piston having a first piston portion axially spaced apart from a second piston portion by an intermediate space, wherein the second piston portion is closer to the second portion of the interior chamber than the first piston portion;

a first seal member sealably connected to the first piston portion and sealably separating the intermediate space from the first portion of the interior chamber, wherein the first seal member prevents fluid from moving between the intermediate space and the first portion of the interior chamber past the piston;

a second seal member sealably connected to the second piston portion and sealably separating the intermediate space from the second portion of the interior chamber, wherein the second seal member prevents fluid from moving between the intermediate space and the second portion of the interior chamber past the piston;

a piston biasing member in the intermediate space and coupled to the piston between the first and second seal members;

a throttling seat securely connected to the body adjacent to the first portion of the interior chamber, the throttling seat having a throttling channel therethrough in direct communication with the flow inlet passage and with the first portion of the interior chamber, the throttling channel has a flow entrance and tapered exit opening defining a flow exit and facing toward the first portion of the interior chamber, the throttling seat receives the flow of fluid from the flow inlet passage through the flow entrance, and the flow of fluid exits through the flow exit and passes into the first portion of the interior chamber;

a throttling cone moveably disposed in the first portion of the interior chamber and supported by the first portion of the piston, the throttling cone having a tapered portion shaped to mate with the tapered exit opening of the throttling seat, the throttling cone being movable relative to the throttling seat, the tapered portion is spaced apart from the throttling seat and allows the fluid to flow between the throttling seat and the throttling cone and enter the first portion of the interior chamber at an intermediate pressure (P2) less than the inlet pressure (P1) and greater than the outlet pressure (P3), wherein fluid pressure of the fluid in the first portion of the interior chamber between the throttling seat and the first seal member is approximately the intermediate pressure (P2), the throttling cone having a tapered portion with a first diameter;

a push rod assembly having a push rod connected to the second end portion of the piston and having a rod portion extending into the push-rod channel, a seal member sealably engaging the rod portion separating the push rod channel from the second portion of the interior chamber, the rod portion having a second diameter substantially equal to the first diameter of the throttling cone;

a first pilot passageway interconnecting the inlet channel to the push rod channel, wherein fluid in the first pilot channel and in the push rod channel acting against the rod portion is substantially at the inlet pressure (P1), whereby fluid pressure acting on the tapered portion of the throttling cone with the first diameter is balanced by fluid pressure acting on the rod portion in the push rod channel;

a second pilot passageway interconnecting the intermediate passageway with the second portion of the interior chamber, wherein fluid in the second pilot channel and in the second portion of the interior chamber is substantially at the intermediate pressure (P2);

a third pilot channel interconnecting the outlet channel to the intermediate space of the interior chamber between the first and second seal members, wherein fluid in the third pilot channel and in the intermediate space of the interior chamber between the first and second seal members is substantially at the outlet pressure (P3); and a restriction assembly intermediate the outlet passageway and the flow outlet, the restriction assembly comprises a valve seat and restrictor axially adjustable relative to the valve seat between a closed position and an open position, the restrictor in the closed position blocks the fluid in the outlet passageway from flowing to the flow outlet, and the restrictor in the open position allows the fluid in the outlet passageway to flow between the restrictor and valve seat at a selected constant flow rate into the outlet passageway at the outlet pressure (P3), wherein the selected constant flow rate is independent of a pressure differential between the outlet pressure (P3) and the inlet pressure (P1).

23. The flow rate controller of claim 22 wherein the piston biasing member is radially outward and concentrically arranged with at least a portion of the piston.

24. The flow rate controller of claim 22 wherein the throttling cone is configured to move away from the throttling seat in the event of pressure spike of the inlet pressure (P1) of the fluid flowing into the throttling seat.

25. The flow rate controller of claim 22 wherein the first piston portion of the piston facing the first portion of the interior chamber has a first area against which the fluid at the intermediate pressure (P2) acts, and the second piston portion of the piston facing the second portion of the interior chamber has a second area against which the fluid at the intermediate pressure (P2) acts, wherein the first area is substantially equal to the second area.

26. The flow rate controller of claim 22 wherein the throttling cone is directly connected to the push rod assembly.

27. The flow rate controller of claim 22 wherein the restriction assembly is an adjustable fixed restriction device coupled to an adjustment member.

28. The flow rate controller of claim 22 wherein the restriction assembly is a needle restriction assembly, valve seat is a needle trim, and the restrictor is a needle coaxially aligned with the needle trim.

* * * * *